(12) United States Patent
Oveyssi

(10) Patent No.: US 6,731,470 B1
(45) Date of Patent: May 4, 2004

(54) PIVOT BEARING CARTRIDGE HAVING INNER AND OUTER BALL BEARING SETS

(75) Inventor: Kamran Oveyssi, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 199 days.

(21) Appl. No.: 09/823,740

(22) Filed: Mar. 30, 2001

(51) Int. Cl.7 .............................................. G11B 21/08
(52) U.S. Cl. ................................................... 360/265.6
(58) Field of Search ........................... 360/265.6, 99.08; 384/490, 499, 504, 461; 310/156.08

(56) References Cited

U.S. PATENT DOCUMENTS

| | | | | |
|---|---|---|---|---|
| 2,488,825 A | * | 11/1949 | Palumbo ..................... | 384/453 |
| 2,647,807 A | * | 8/1953 | Brunstrum ................... | 384/461 |
| 3,737,202 A | * | 6/1973 | Rosales ........................ | 384/461 |
| 5,138,477 A | * | 8/1992 | Omura et al. ............... | 359/200 |
| 5,161,077 A | * | 11/1992 | Jabbari ....................... | 360/265.6 |
| 5,228,845 A | * | 7/1993 | Steele ......................... | 418/55.1 |
| 5,627,702 A | * | 5/1997 | Kelemen et al. .......... | 360/265.6 |
| 6,115,213 A | * | 9/2000 | Ikeda et al. ............... | 360/99.08 |
| 6,196,725 B1 | * | 3/2001 | Brown ........................ | 384/461 |

\* cited by examiner

*Primary Examiner*—David Davis
(74) *Attorney, Agent, or Firm*—Won Tae C. Kim, Esq.; Milad G. Shara, Esq.; Stetina Brunda Garred & Brucker

(57) ABSTRACT

A pivot bearing cartridge for use in a head stack assembly. The pivot bearing cartridge is provided with a pivot bearing cartridge base. The pivot bearing cartridge is provided with a pivot shaft in mechanical communication with the pivot bearing cartridge base. The pivot bearing cartridge is provided with an inner ball bearing set surrounding the pivot shaft. The inner ball bearing set has a first inner race and a first outer race. The first inner race is attached to the pivot shaft. The pivot bearing cartridge is provided with an outer ball bearing set surrounding the inner ball bearing set. The outer ball bearing set has a second inner race and a second outer race. The second inner race is fixed relative to the first outer race.

19 Claims, 3 Drawing Sheets

PIVOT BEARING CARTRIDGE HAVING INNER AND OUTER BALL BEARING SETS

BACKGROUND OF THE INVENTION

1. Cross-Reference to Related Applications

Not Applicable.

2. Field of the Invention

The present invention relates generally to pivot bearing cartridges use in a head stack assemblies, and more particularly to a pivot bearing cartridge having inner and outer ball bearing sets.

3. Description of the Prior Art

The typical hard disk drive includes a disk drive base, and a head disk assembly (HDA) and a printed circuit board assembly (PCBA) attached to the disk drive base. The head disk assembly includes at least one magnetic disk, a spindle motor for rotating the disk, and a head stack assembly (HSA) that includes at least one transducer head, typically several, for reading and writing data from the disk. The printed circuit board assembly includes a servo control system in the form of a disk controller for generating servo control signals. The heads stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit cable assembly. A conventional "rotary" or "swing-type" actuator assembly typically comprises an actuator body that rotates on a pivot assembly between limited positions, a coil portion that extends from one side of the actuator body to interact with one or more permanent magnets to form a voice coil motor, and one or more actuator arms which that extend from an opposite side of the actuator body. A head gimbal assembly includes at least one transducer head, sometimes two, which is distally attached to each of the actuator arms. The actuator assembly includes the actuator body which has a bore and a pivot bearing cartridge engaged within the bore. The at least one head gimbal assembly and the flex circuit cable assembly are attached to the actuator assembly.

The pivot bearing cartridge typically includes a pivot shaft having a threaded end, a pivot sleeve, and vertically separated upper and lower ball bearing sets mounted upon the pivot shaft which facilitate rotational attachment of the pivot sleeve to the pivot shaft. The pivot sleeve is disposed within the bore of the actuator body for allowing the pivoting of the actuator assembly. The threaded end of the pivot shaft used to mount the pivot bearing cartridge, and therefore the actuator assembly, to the disk drive base. Each ball bearing set includes inner and outer ball bearing races which encase a plurality of ball bearings. The inner ball bearing races engage the pivot shaft and the outer ball bearing races engage the pivot sleeve. This configuration allows for rotational movement of the outer ball bearing races relative to the inner ball bearing races for rotation of the pivot sleeve. The upper and lower ball bearing sets are pre-loaded in compression to maintain the pivot sleeve in position with respect to the pivot shaft.

A topic of concern is the desire to reduce the overall disk drive size. Such disk drives may have a variety of applications such as in hand held or portable electronic devices. The exterior size and shape of the disk drive is often referred to as a "form factor". Reduction of such disk drive form factor has proven challenging. This is because the mere reduction of the size of the various disk drive components may result in such components being unable to conform to required specifications and standard form factors for such components, and may result in installation or assembly difficulties. As such reduced sized disk drives may have applications in hand held or mobile electronic device, the specifications may be even be tighter as compared to personal computer applications. For example, those specifications related to susceptibility to damage resulting from shock.

One particular area of focus is the reduction of the height of the pivot bearing cartridge as this limited the over all sizing of the head stack assembly. In a typical configuration, the pivot bearing cartridge height may be a function of the upper and lower ball bearing set arrangement. The mere reduction of the sizing of the upper and lower ball bearing sets impacts the susceptibility to damage resulting from shock, potential use of non-standard form factor bearings and difficulties conforming to allotted space requirements for such bearings. Accordingly, there is a need in the art for an improved pivot bearing cartridge configuration in comparison to the prior art.

SUMMARY OF THE INVENTION

An aspect of the invention can be regarded as a pivot bearing cartridge for use in a head stack assembly. The pivot bearing cartridge is provided with a pivot bearing cartridge base. The pivot bearing cartridge is provided with a pivot shaft in mechanical communication with the pivot bearing cartridge base. The pivot bearing cartridge is provided with an inner ball bearing set surrounding the pivot shaft. The inner ball bearing set has a first inner race and a first outer race. The first inner race is attached to the pivot shaft. The pivot bearing cartridge is provided with an outer ball bearing set surrounding the inner ball bearing set. The outer ball bearing set has a second inner race and a second outer race. The second inner race is fixed relative to the first outer race.

Preferably, the inner and outer ball bearing sets are pre-loaded in compression. The first inner race may be axially off-set from the first outer race, and the second inner race may be axially off-set from the second outer race. The second inner race may be attached to the first outer race. Further, the outer ball bearing set may have a cross sectional size different than a cross sectional size of the inner ball bear set.

In an embodiment of the present invention, the pivot bearing cartridge is further provided with a pivot bearing cartridge cap. The motor shaft is attached to the pivot bearing cartridge cap. Thus, in this embodiment, the pivot shaft is rotatable. The pivot bearing cartridge cap has a cap annular member extending from the pivot bearing cartridge cap, and the cap annular member is attached to the second outer race. The pivot bearing cartridge base has a base annular member extending from the pivot cartridge base, and the base annular member is attached to the first outer race and the second inner race.

In another embodiment of the present invention, pivot shaft is attached to the pivot bearing cartridge base. Thus, in this embodiment, the pivot shaft is stationary. The pivot bearing cartridge base has a base annular member extending from the pivot cartridge base, and the base annular member is attached to the second outer race. The pivot bearing cartridge is further provided with a pivot bearing cartridge cap, and the cap annular member is attached to the first outer race and the second inner race.

In addition, according to another aspect of the present invention, there is provided a head stack assembly that includes an actuator body and a pivot bearing cartridge according to an above described embodiment. The actuator body is provided with a bore and the pivot bearing cartridge is disposed within the bore. As the pivot bearing cartridge may be provided with a pivot bearing cartridge cap, the pivot bearing cartridge cap may be utilized as a pivot sleeve for engaging the bore.

DESCRIPTION OF THE PREFERRED EMBODIMENTS

Figure 1:
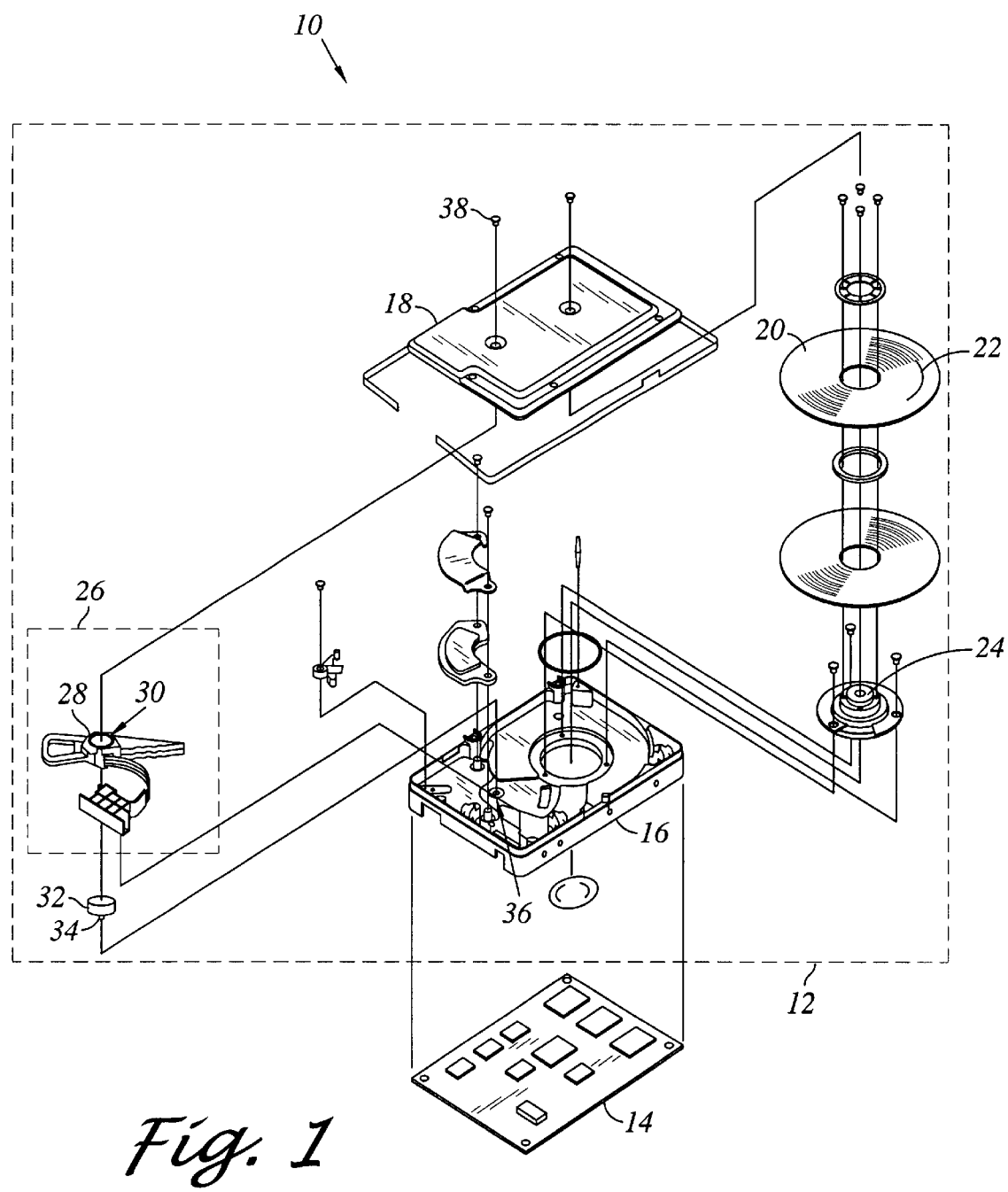
FIG. 1 is an exploded perspective view of a disk drive including a pivot bearing cartridge as constructed in accordance with an aspect of the present invention.

Referring now to the drawings wherein the showings are for purposes of illustrating preferred embodiments of the present invention only, and not for purposes of limiting the same, FIGS. 1–6 illustrate a disk drive 10 and pivot bearing cartridge 32 in accordance with the aspects of the present invention.

Referring now to FIG. 1 there is depicted an exploded perspective view a disk drive 10 constructed in accordance with an aspect of the present invention. The disk drive 10 includes a head disk assembly (HDA) 12 and a printed circuit board assembly (PCBA) 14. The head disk assembly 12 includes a disk drive base 16 and a cover 18 that collectively house at least one magnetic disk 20 (two disks 20 are shown). The disks 20 contain a plurality of tracks 22 for reading and writing data. The head disk assembly 12 further includes a pivot bearing cartridge 32 for rotating the disks 20 and a head stack assembly 26.

The head stack assembly 26 includes an actuator assembly which includes an actuator body 28 having a bore 30. The actuator assembly further includes a pivot bearing cartridge 32 which is disposed within the bore 30 of the actuator body 28. The pivot bearing cartridge 32 may have a threaded end 34 which engages a threaded hole 36 in the disk drive base 16. Further, the pivot bearing cartridge 32 may be attached to the cover 18 with the use of the screw 38.

Figure 2:
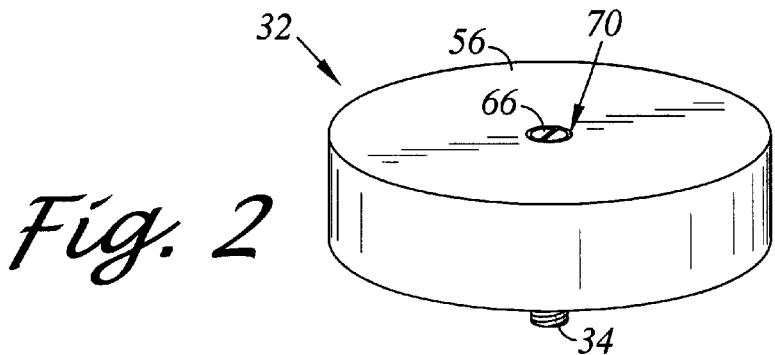
FIG. 2 is a perspective view of a pivot bearing cartridge as constructed in accordance with an aspect of the present invention.
Figure 3:
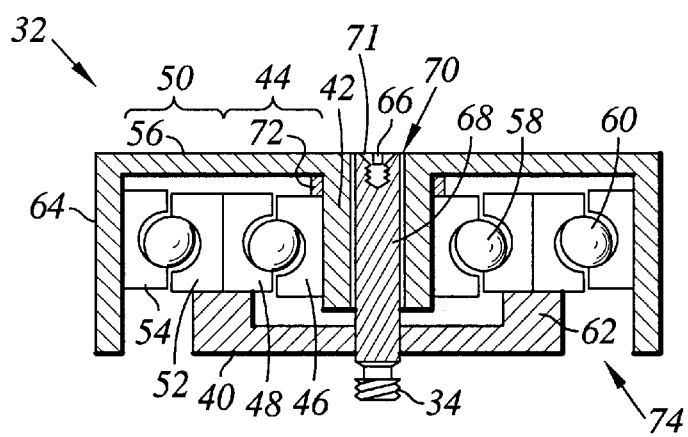
FIG. 3 is a cross sectional view of the pivot bearing cartridge of FIG. 2.

Referring now to FIG. 2, there is depicted a perspective view of the pivot bearing cartridge 32 as constructed in accordance with an embodiment of the present invention. FIG. 3 is a cross sectional view of the pivot bearing cartridge 32 of FIG. 2. The pivot bearing cartridge 32 is provided with a pivot bearing cartridge base 40. The pivot bearing cartridge 32 is further provided with a pivot shaft 42 disposed in mechanical communication with the pivot bearing cartridge base 40. The pivot bearing cartridge 32 is further provided with an inner ball bearing set 44 surrounding the pivot shaft 42. The inner ball bearing set 44 has a first inner race 46 and a first outer race 48. The first inner race 46 is attached to the pivot shaft 32. The pivot bearing cartridge 32 is further provided with an outer ball bearing set 50 surrounding the inner ball bearing set 44. The outer ball bearing set 50 has a second inner race 52 and a second outer race 54. The second inner race 52 is fixed relative to the first outer race 48.

In further detail according to an embodiment of the present invention, the pivot bearing cartridge 32 may be provided with a pivot bearing cartridge cap 56. As mentioned above, the inner ball bearing set 44 has a first inner race 46 and a first outer race 48. The first inner race 46 and first outer race 48 cooperatively encase a plurality of inner ball bearings 58. Similarly, the outer ball bearing set 50 has a second inner race 52 and a second outer race 54 which cooperatively encase a plurality of outer ball bearings 60.

According to such embodiment depicted in FIGS. 2 and 3, the pivot shaft 42 is attached to the pivot bearing cartridge cap 56. Thus, the pivot shaft 42 is rotatable. The first inner race 46 is attached to the pivot shaft 42. The pivot bearing cartridge base 40 has a base annular member 62 extending from the pivot bearing cartridge base 40. The base annular member 62 is attached to the first outer race 48 and the second inner race 52. The first outer race 48 and the second inner race 52 may be attached to each other. Further, the pivot bearing cartridge cap 56 may be provided with a cap annular member 64. The cap annular member 64 may be attached to the second outer race 54. As such, as the first outer race 48 and the second inner race 52 are attached to the base annular member 62, the first outer race 48 and the second inner race 52 are relatively stationary. In contrast, as the first inner race 46 and the second outer race 54 are respectively attached to the pivot shaft 42 and the cap annular member 64, the first inner race 46 and the second outer race 54 are rotatable with rotation of the pivot bearing cartridge cap 56 due to movement of an engaged actuator body 28. Moreover, the cap annular member 62 may be formed to engage the bore 30 of the actuator body 28. As such, the cap annular member 62 may be of pivot sleeve.

In addition, the threaded end 34 of the pivot bearing cartridge 32 extends from the pivot bearing cartridge base 40 for attachment to the disk drive base 16. Further, the pivot shaft 32 may be provided with a pivot shaft bore 70 for allowing tooling engagement with a slot 66 formed in an inner shaft 68 extending centrally from the pivot bearing cartridge base 40 for attaching the pivot bearing cartridge 32 to the disk drive base 16. The inner shaft 68 may extend through the pivot shaft bore 70 without engaging the pivot shaft bore 70. The inner shaft 68 may have a screw hole 71 for receiving the screw 38 for attachment with the cover 18. Other attachment arrangements for attaching the pivot bearing cartridge 32 to the disk drive base 16 and the cover 18 may include, for example, a post extending upwardly from the disk drive base 16 and a screw engaging the post with the cover 18 and disk drive base 16 bearing compressed against the pivot shaft 42.

The inner and outer ball bearing sets 44, 50 are preferably pre-loaded in compression. Referring now specifically to the cross sectional view of FIG. 3, the first inner race 46 is off-set from the first outer race 48 with the ball bearings 58 disposed in compression. A race seating member 72 may be installed within the pivot bearing cartridge cap 56 about the pivot shaft 42 for supporting and positioning of the first inner race 46 axially along the pivot shaft 42. The second inner race 52 is off-set from the second outer race 54 with the outer ball bearings 60 disposed in compression. A base access gap 74 may be formed between the base annular member 62 and the cap annular member 64 for access to the second outer race 54 during installation for positioning the second outer race 54 for attachment to the cap annular member 64 with the outer ball bearings 60 in compression. As such, the second outer race 54 may be attached to the cap annular member 64 with an adhesive and tooling may be provided to impart force against the second outer race 54 during setting of the adhesive. It is contemplated that other pre-loading geometric configurations of the inner and outer ball bearing sets 44, 50 may be utilized. As such, the race seating member 72 for example may be disposed at the lower end of the first inner race 46 and access to the second outer race 54 may be via the pivot bearing cartridge cap 56.

Figure 4:
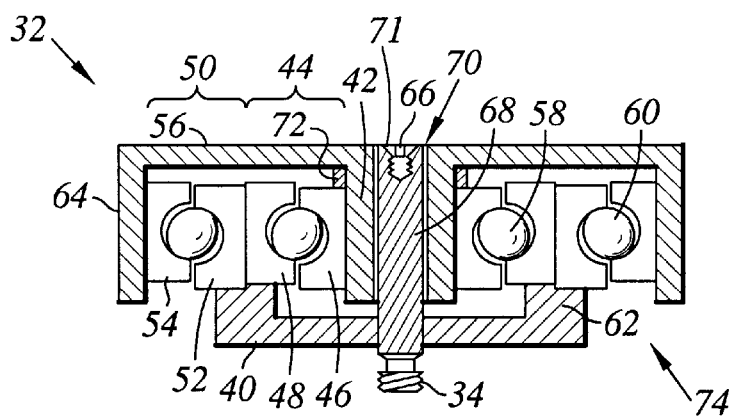
FIG. 4 is a cross sectional view similar to that of FIG. 3 of a pivot bearing cartridge according to another embodiment of the present invention with a first outer race being axially off-set from a second inner race.

Referring now to FIG. 4, there is depicted another embodiment of the present invention. In particular, the base annular member 62 is stepped to vertically off-set the first outer race 48 with respect to the second inner race 52. Such stepped nature of the base annular member 62 is contemplated to facilitate seating and positioning of the first outer race 48 and the second inner race 52.

Figure 5:
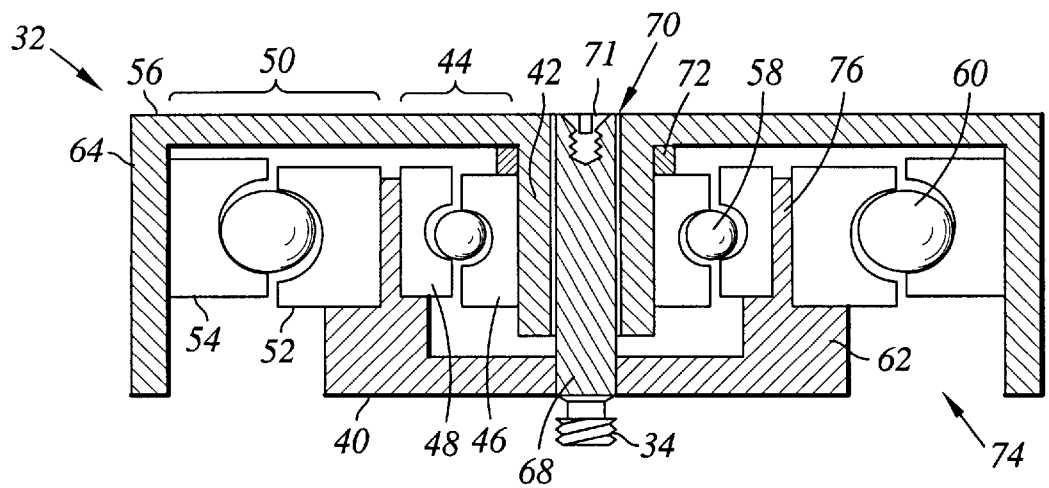
FIG. 5 is a cross sectional view similar to that of FIG. 3 of a pivot bearing cartridge according to another embodiment of the present invention with a first outer race being separated from a second inner race by a race support.

Referring now to FIG. 5, there is depicted another embodiment of the present invention. In particular, the base annular member 62 may be provided with a vertical race support 76. The vertical race support 76 extends between the first outer race 48 and the second inner race 52 to facilitate seating and positioning of the first outer race 48 and the second inner race 52. As additionally illustrated in FIG. 5, the inner and outer ball bearing sets 44, 50 may be of differing sizes. For example, the outer ball bearing set 50 may be sized greater than the inner ball bearing set 44. In addition, the inner and outer ball bearing sets 44, 50 may have differing number of ball bearings 58, 60.

Figure 6:
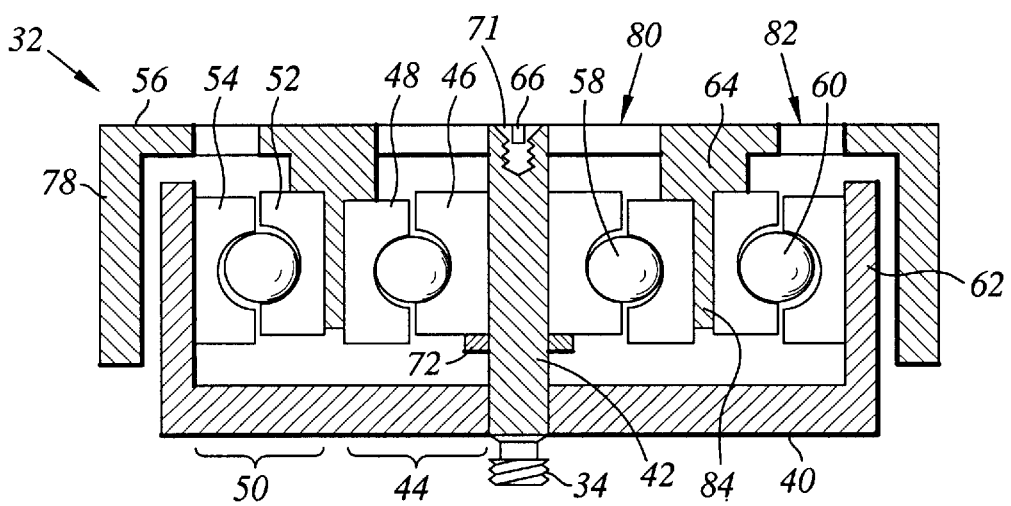
FIG. 6 is a cross sectional view similar to that of FIG. 3 of a pivot bearing cartridge according to another embodiment of the present invention with a pivot shaft attached to a pivot bearing cartridge base.

Referring now to FIG. 6, there is depicted yet another embodiment of the present invention. In this embodiment, the pivot shaft 42 is attached to the pivot bearing cartridge base 40. Thus, the pivot shaft 42 is relatively stationary. The first inner race 46 is attached to the pivot shaft 42. In this embodiment, the slot 66 for attaching the pivot bearing cartridge 32 to the disk drive base 16 and the screw hole 71 for receiving the screw 38 for attachment with the cover 18 are formed in the pivot shaft 42. Further, the cap annular member 64 is attached to the first outer race 48 and the second inner race 52. The cap annular member 64 may be modified to provide various seating geometries for the first outer race 48 and the second inner race 52 with respect to each other (similar to those of the base annular member 62 of the embodiments shown in FIGS. 3–5). In this regard, the embodiment depicted in FIG. 6 has an analogous race seating geometry for the first outer race 48 and the second inner race 52 as depicted in FIG. 5. As such, the cap annular member 64 may be provided with a vertical race support 84. The base annular member 62 is attached to the second outer race 54. The pivot bearing cartridge cap 56 may further be provided with an annular sleeve 78 for engaging the bore 30 of the actuator body 28. Cap access openings 80,82 may be formed in the pivot bearing cartridge cap 56 for allowing access to the inner and outer ball bearing sets 42, 50, and in particular the second outer race 54 in the embodiment depicted, for pre-loading installation. In this regard, the cap access opening 80 may be formed from a ring cut, whereas cap access opening 82 may take the form of selectively distributed holes formed in the pivot bearing cartridge cap 56.

I claim:

1. A pivot bearing cartridge for use in a head stack assembly, the pivot bearing cartridge comprising:
   a pivot bearing cartridge base;
   a rotatable pivot shaft in mechanical communication with the pivot bearing cartridge base;
   a pivot bearing cartridge cap attached to the pivot shaft;
   a single inner ball bearing set surrounding the pivot shaft, the inner ball bearing set having a first inner race and a first outer race; and
   a single outer ball bearing set surrounding the inner ball bearing set, the outer ball bearing set having a second inner race and a second outer race, the first outer race and the second inner race are attached to the pivot bearing cartridge base, the first inner race is attached to the pivot shaft and the second outer race is attached to the pivot bearing cartridge cap.

2. The pivot bearing cartridge of claim 1 wherein the inner and outer ball bearing sets are pre-loaded in compression.

3. The pivot bearing cartridge of claim 2 wherein the first inner race is axially off-set from the first outer race, the second inner race is axially off-set from the second outer race.

4. The pivot bearing cartridge or claim 1 wherein the second inner race is attached to the first outer race.

5. The pivot bearing cartridge of claim 1 wherein the outer ball bearing set has a cross sectional size different than a cross sectional size of the inner ball bearing set.

6. The pivot bearing cartridge of claim 1 wherein the pivot bearing cartridge base his a base annular member extending from the pivot bearing cartridge base.

7. The pivot bearing cartridge of claim 1 wherein the pivot bearing cartridge cap has a cap annular member extending from the pivot bearing cartridge cap.

8. The pivot bearing cartridge of claim 7 wherein the cap annular member is a pivot sleeve.

9. The pivot bearing cartridge of claim 1 wherein the pivot bearing cartridge cap has a cap annular member extending from the pivot bearing cartridge cap, the cap annular member is attached to the second outer race, the pivot bearing cartridge base has a base annular member extending from the pivot cartridge base, the base annular member is attached to the first outer race and the second inner race.

10. A disk drive comprising:
    a head stack assembly having an actuator body, the actuator body having a bore; and
    a pivot bearing cartridge disposed within the bore, the pivot bearing cartridge comprising:
    a pivot bearing cartridge base;
    a rotatable pivot shaft in mechanical communication with the pivot bearing cartridge base;
    a pivot bearing cartridge cap attached to the pivot shaft;
    a single inner ball bearing set surrounding the pivot shaft, the inner ball bearing set having a first inner race and a first outer race; and
    a single outer ball bearing set surrounding the inner ball bearing set, the outer ball bearing set having a second inner race and a second outer race, the first outer race and the second inner race are attached to the pivot bearing carriage base, the first inner race is attached to the pivot shaft and the second outer race is attached to the pivot bearing cartridge cap.

11. The disk drive of claim 10 wherein the inner and outer ball bearing sets are pre-loaded in compression.

12. The disk drive of claim 11 wherein the first inner race is axially off-set from the first outer race, the second inner race is axially off-set from the second outer race.

13. The disk drive of claim 10 wherein the second inner race is attached to the first outer race.

14. The disk drive of claim 10 wherein die outer ball bearing set has a cross sectional size different than a cross sectional size of the inner ball bearing set.

15. The disk drive of claim 10 wherein the pivot bearing cartridge base has a base annular member extending from the pivot bearing cartridge base.

16. The disk drive of claim 10 wherein the pivot bearing cartridge cap has a cap annular member extending from the pivot bearing cartridge cap.

17. The disk drive of claim 16 wherein the cap annular member is a pivot sleeve.

18. The disk drive of claim 10 wherein the pivot bearing cartridge cap has a cap annular member extending from the pivot bearing cartridge cap, the cap annular member is attached to the second outer race, the pivot bearing cartridge base has a base annular member extending from the pivot cartridge base, the base annular member is attached to the first outer race and the second inner race.

19. A pivot bearing cartridge for use in a head stack assembly, the pivot bearing cartridge comprising:
   a pivot bearing cartridge base;
   a stationary pivot shaft attached to the pivot bearing cartridge base;
   a pivot bearing cartridge cap rotatably attached to the pivot bearing cartridge base;
   a single inner ball bearing set surrounding the stationary pivot shaft, the inner ball bearing set having a first inner race and a first outer race; and
   a single outer ball bearing set surrounding the inner ball bearing set, the outer ball bearing set having a second inner race and a second outer race;
   wherein the first inner race is attached to the stationary pivot shaft, the second outer race is attached to the pivot bearing cartridge base and the first outer race and the second inner race are attached to the pivot bearing cartridge cap.

\* \* \* \* \*